United States Patent
Anantharam et al.

(10) Patent No.: US 10,169,215 B2
(45) Date of Patent: Jan. 1, 2019

(54) METHOD AND SYSTEM FOR ANALYZING TEST CASES FOR AUTOMATICALLY GENERATING OPTIMIZED BUSINESS MODELS

(71) Applicant: Cognizant Technology Solutions India Pvt. Ltd., Chennai (IN)

(72) Inventors: Arkalgud Subbaraju Anantharam, Bangalore (IN); Inti Sandeep, Kakinada (IN); Vijaya Balaji Soundararajan, Namakkal (IN); Divya Chanalu, Bellary (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 120 days.

(21) Appl. No.: 15/587,491

(22) Filed: May 5, 2017

(65) Prior Publication Data

US 2018/0089058 A1 Mar. 29, 2018

(30) Foreign Application Priority Data

Sep. 26, 2016 (IN) .............................. 201641032830

(51) Int. Cl.
*G06F 11/36* (2006.01)
(52) U.S. Cl.
CPC ........ *G06F 11/368* (2013.01); *G06F 11/3692* (2013.01)
(58) Field of Classification Search
CPC .............................. G06F 11/36; G06F 11/3692

USPC ....................................................... 714/38.1
See application file for complete search history.

(56) References Cited

U.S. PATENT DOCUMENTS

| | | | | |
|---|---|---|---|---|
| 2003/0212661 A1* | 11/2003 | Avvari | ................ | G06F 11/3676 |
| 2004/0025088 A1* | 2/2004 | Avvari | ................ | G06F 11/3676 714/38.13 |
| 2005/0037326 A1* | 2/2005 | Kuntz | ...................... | G09B 7/00 434/353 |
| 2007/0105084 A1* | 5/2007 | Kuntz | ...................... | G09B 7/02 434/350 |
| 2010/0287534 A1* | 11/2010 | Vangala | ............. | G06F 11/3612 717/124 |
| 2013/0311976 A1* | 11/2013 | Bhat | ................... | G06F 11/3676 717/130 |
| 2014/0195284 A1* | 7/2014 | Purandare | ............ | G06Q 10/067 705/7.11 |

* cited by examiner

*Primary Examiner* — Kamini B Patel
(74) *Attorney, Agent, or Firm* — Cantor Colburn LLP (57) ABSTRACT

A method and a system for analyzing one or more test case trees for automatically generating an optimized test tree model are disclosed. The one or more test case trees are received and analyzed to identify a source tree and a target tree. Further, levels of each node of the source tree and the target tree are analyzed to identify a source node and a target node. The source node and the target node are compared to obtain a match. The source node is merged with the target node if the match is obtained. Else, a next source node and a next target node are identified based on one or more parameters. The identified nodes are subsequently compared and merged. The merged nodes are further optimized to generate the optimized tree model.

17 Claims, 10 Drawing Sheets

METHOD AND SYSTEM FOR ANALYZING TEST CASES FOR AUTOMATICALLY GENERATING OPTIMIZED BUSINESS MODELS

FIELD OF THE INVENTION

The present invention relates generally to the field of software testing, and more particularly, to a method and a system for analyzing software test cases for automatically generating optimized business models.

BACKGROUND OF THE INVENTION

In the field of software testing, a plurality of test case are generated and executed to identify the bugs and errors of the software application or system under test. Various techniques are used to generate the test cases wherein requirements and specifications of the software application under test are contemplated, and subsequently the test cases are built around the requirements and specification. For example, model-based testing technique can be used to derive a plurality of test cases from one or more models that describe the functional requirements of the system under test.

Model based testing technique facilitates in eliminating the need for manual test design in the entire cycle of software testing of an application. Once the requirements of the software application are contemplated by the test engineer, the same can be converted into business models. The business models can further be used for automatically identifying and generating test cases.

One problem associated with the model based testing technique is that for a numerous existing software applications or systems, no models may be available to be used for generating the test cases. In such scenarios, models are manually generated for the existing software applications using various reverse engineering tools. However, large software applications or systems may have a large number of functional requirements. Hence, software test engineers may not be able to manually incorporate the substantial number of requirements for designing the models that cover all the essential aspects of the application.

In some scenarios, software products may be in their maintenance phase. These products may have a huge set of existing test cases that can be used for generating business models via the reverse engineering solutions. In order to implement and secure the benefits of model based testing, the software test engineers need to invest huge efforts, so that the existing test cases can be converted into business models. However, the conversion of existing test cases into business models is a manual exercise. Predominantly, the initial conversion is a costly and manual effort. Additionally, there may be redundant test cases as the test cases available may be developed by different developers/engineers at various different locations and time. This requires the software test engineers to filter out the redundancy in the process of generating the business models. Hence, the software test engineers are often hesitant to adopt the reverse engineering solution.

In light of the abovementioned disadvantages, there is a need for a method and system for analysis of available test cases. In addition, there is a need for a method and system for optimization and visualization of the available test cases for automatically generating business models for efficient and effective software testing.

SUMMARY

A system and a computer-implemented method for analyzing one or more test case trees for automatically generating an optimized test tree model are provided.

The computer-implemented method comprises the steps of: configuring a computer processor to receive the one or more test case trees as user input from a user interface, each tree having one or more nodes that corresponds to a functionality of a test case; analyzing each of the received test case trees to identify a source tree and a target tree based on the length of the test case tree; analyzing levels of each node of the source tree and the target tree for identifying a source node and a target node, the source node being the bottom most node of the source tree and the target node being the bottom most node of the target tree; comparing the source node and the target node, based on one or more parameters, to obtain a match; merging the source node with the target node when the match is obtained, else identifying a next source node and a next target node, and repeating the steps of comparing and merging the identified nodes; optimizing the merged nodes by identifying and filtering out one or more invalid nodes and generating the optimized tree model by using the optimized nodes.

In one embodiment of the present invention, the system for analyzing one or more test case trees for automatically generating an optimized test tree model comprises at least one computer processor, a receiving module configured by the at least one computer processor for receiving the one or more test case trees as user input from a user interface, wherein each tree comprises one or more nodes and each node corresponds to a functionality of a test case, and wherein based on the length of the test case trees, the received one or more test case trees are analyzed by the at least one computer processor to identify a source tree and a target tree. In one embodiment, the source tree is the lengthiest tree of the one or more test case trees, and the target tree is the next lengthiest tree of the one or more test case trees.

The system further comprises a comparison module configured by the at least one computer processor to compare a source node and a target node based on one or more parameters to obtain a match, wherein the source node and the target node are the bottom most nodes of the source tree and the target tree respectively, and the source node and the target node are identified by the at least one computer processor by analyzing levels of each node of the source tree and the target tree. A merging module is configured by the at least one computer processor to merge the source node with the target node when the match is obtained. When the match is not obtained, the at least one computer processor identifies a next source node and a next target node, and the steps of comparing and merging are repeated for the identified nodes. A repository may be provided to store the references of the merged nodes. Further, an optimization module may be configured by the at least one computer processor to optimize the merged nodes by identifying and filtering out one or more invalid nodes and generating the optimized tree model by using the optimized nodes.

In various embodiments of the present system, the one or more parameters include but is not limited to test case IDs, processing steps of the test cases, paths between the start nodes and the end nodes, user preferences, expected results, and actions related to the test case. The identification of the next source node and the next target node is further based on the references of the previously identified source nodes, target nodes and the merged nodes.

In one embodiment of the present invention, the test tree models can be optimized by connecting the path of the target node with the path of the source node. The invalid nodes are filtered out by using a logical expression comprising a Boolean operator and reference of the invalid node.

In one embodiment of the present invention, a computer program product is provided. The computer program product comprises a non-transitory computer readable medium having computer readable program code stored thereon, the computer readable program code comprising instructions that, when executed by at least one computer processor, cause the at least one computer processor to: receive the one or more test case trees as user input from a user interface, each tree having one or more nodes, each node corresponding to a functionality of a test case; analyze each of the received test case trees to identify a source tree and a target tree based on the length of the test case tree; analyze levels of each node of the source tree and the target tree for identifying a source node and a target node, the source node being the bottom most node of the source tree and the target node being the bottom most node of the target tree; compare the source node and the target node, based on one or more parameters, to obtain a match; merge the source node with the target node when the match is obtained, else identifying a next source node and a next target node, and repeating the steps of comparing and merging the identified nodes; optimize the merged nodes by identifying and filtering out one or more invalid nodes and generating the optimized tree model by using the optimized nodes.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

A system and a method for analyzing software test cases for automatically generating optimized business models are described. The invention provides a method and a system for facilitating the testers to analyze existing test cases for generating and implementing effective business models. Further, the invention provides for a system and method for adopting model-based testing solutions for facilitating the testers to automatically generate the optimized business models in one single click.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

Figure 1:
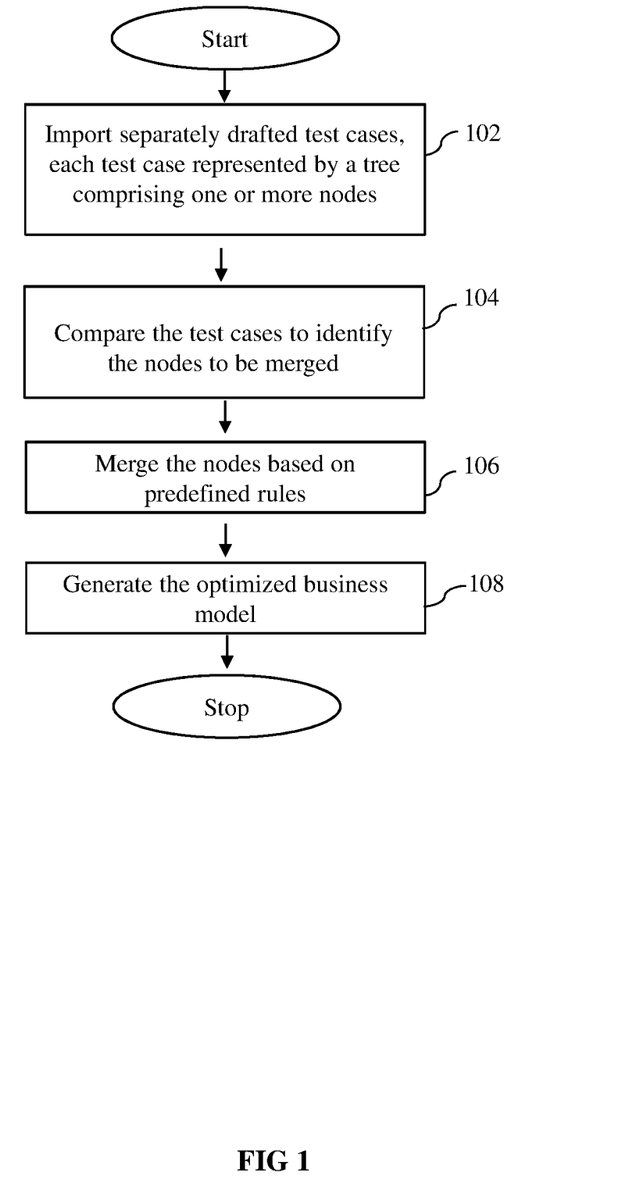
FIG. 1 is a flowchart illustrating the method for analyzing software test cases for automatically generating optimized business models, in accordance with an embodiment of the present invention.

FIG. 1 is a flowchart illustrating the method for analyzing software test cases for automatically generating optimized business models, in accordance with an embodiment of the present invention. At step 102, one or more test cases are received from various sources. The one or more test cases are the existing test cases that are either drafted manually, or are automatically generated by using business models and various software tools. The test cases are generally drafted by the software test engineers for testing the various functional aspects of a software application or system under test. In an embodiment of the present invention, the test cases are represented by one or more tree models or test case trees. The one or more separately drafted test cases are imported within a receiving module. Each test case is represented by a test case tree comprising one or more nodes such as start node, end node, processing node, decision node and various other nodes related to the various business execution flows of the software applications. Thus, each node represents a single unit or multiple units of functionalities of the software applications under test. The functionalities or the business transactions of the software application are based on various business requirements of the user including an individual, an organization etcetera.

In one embodiment of the present invention, the test cases may be imported and arranged in a tree-like structure, with each node representing a separate test case. The business flows or paths between any two nodes (i.e. from start node to end node) may represent a test scenario of the test case tree. For instance, input of login credentials by a user, and validation of the credentials by the system may be an example of one test scenario. Few other examples of test scenarios are: providing valid credentials of a user to an Automated Teller Machine (ATM) for withdrawing an amount; or obtaining the balance amount in a saving bank account and so on. These scenarios can be represented as branches in the tree model to describe the course of events of a business transaction flow.

At step 104, the received one or more test cases are selected, and the nodes of the selected test cases are compared step by step to identify the nodes that can be merged together. The nodes to be merged are identified on various parameters. In an exemplary embodiment of the present invention, the various parameters include test case IDs, processing steps of the test cases, paths between the start nodes and the end nodes, inputs and outputs, expected results, and actions related to testing of the software applications.

At step 106, the identified nodes are merged based on one or more predefined rules. At step 108, business models are generated by using the merged test cases. The business models may be generated for various business domains; for example retail business, education systems, insurance business, banking etcetera. The business models are generated by merging the nodes and optimizing the merged nodes. The merged nodes are optimized by removing or reducing any duplicate or redundant nodes. Filtering and cleaning up the duplicative nodes are necessary to ensure effective optimization of the business models being generated. The optimized business models can be further used for generating automated test cases for software testing.

Figure 2A:
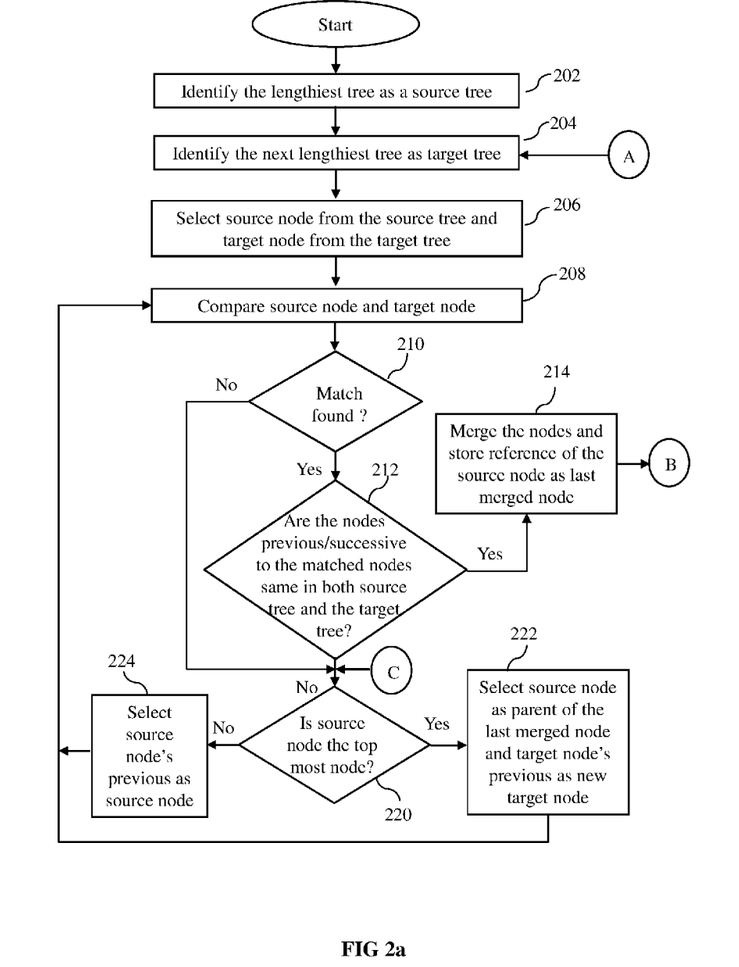
FIG. 2a, 2b show flowchart illustrating the method for comparing the test cases, in accordance with an embodiment of the present invention.
Figure 2B:
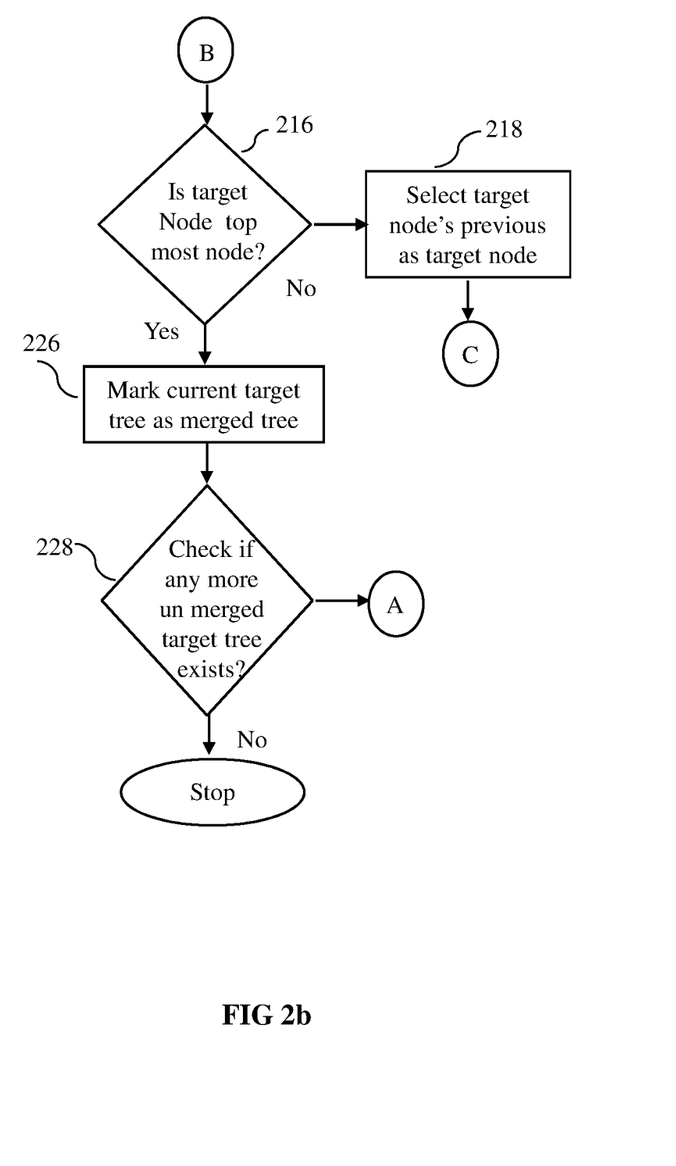

FIG. 2 is a flowchart illustrating the method for comparing the nodes of the test cases, in accordance with an embodiment of the present invention. At step 202, the one or more test cases received from the various sources are analyzed to identify the lengthiest tree of the received test cases. In an exemplary embodiment of the present invention the one or more test cases are received by the receiving module and can be stored in a test case repository. Thereafter, tree models are drafted out of the stored test cases and test case trees are built to represent the corresponding test cases. The test case trees may vary in length based on the number of transaction flows within a test case. The lengthiest test case tree may be identified as the 'source tree'.

At step 204, a second lengthiest case tree is identified. The second lengthiest case tree is the next lengthiest to the source tree. The second or the next lengthiest case tree is identified as the 'target tree'. At step 206, $n^{th}$ node of the source tree is selected along with the nth node of the target tree. In one embodiment of the present invention, the $n^{th}$ node is identified and selected by tracing a node that has no child node. The node without any child node is selected as the $n^{th}$ node. The $n^{th}$ node is the bottom most node of the tree and 'n' is the total number of test steps present in a case tree. The bottom most nodes of the source tree and the target tree are required to be compared. Thus at step 208, the bottom nodes of the source tree and the target tree are compared to find a match. A match occurs when the node of the source tree matches with that of the target tree. At step 210, a check is performed to determine if a match between the nodes is found. If no match is found, then step 220 is performed to analyze the source node to identify if the selected source node is the top most node. If the match is found, then at step 212 a check is performed to determine if the nodes previous or successive to the matched nodes are same in both the source tree and the target tree. If the nodes either previous or successive to the matched nodes are same in the source tree and the target tree, then the nodes are merged at step 214. The selected source node that is participating in the merging process is identified as the 'last merged node'. The reference of the 'last merged node' is saved for forthcoming use, such as identifying the next nodes to be merged. The merging of nodes facilitates in generating the business models. The nodes are also merged to build new test cases. The predefined rules that are implemented in merging of the nodes comprises following conditions. (a) If source test tree node and target test tree node are same; (b) if previous node or next node of both source and target trees are same; (c) if previous node or next node of both source and target nodes do not exist. The nodes are merged when the above defined conditions are complied.

Step 216 is performed to analyze the target node to identify if the selected target node is the top most node. If the selected target node is identified as the topmost node, then step 226 is performed to mark the identified topmost node as the 'merged node'. If the selected target node is not identified as the topmost node, then step 218 is executed to select a node previous to the target node. The selected previous node is processed as the current target node and step 220 is performed to identify if the source node is the top most node. If at step 220, it is identified that the source node is not the topmost node then the node previous to the source node is selected as the source node. If at step 220 it is identified that the source node is the topmost node then step 222 is executed to select source node as parent of 'last merged node'. Further, the previous node of the target node is selected as the current target node. The step 208 is repeated to match the current target node and the current source node. If at step 220 it is identified that the source node is the topmost node then step 224 is executed to select previous node of the source node as the current source node. Thereafter, step 208 is repeated to match the current target node and the current source node. At step 228 a check is performed to determine if one or more unmerged tree exists. If it is identified that any unmerged tree does not exist, then the process of merging process is stopped, else step 204 is repeated.

Figure 3:
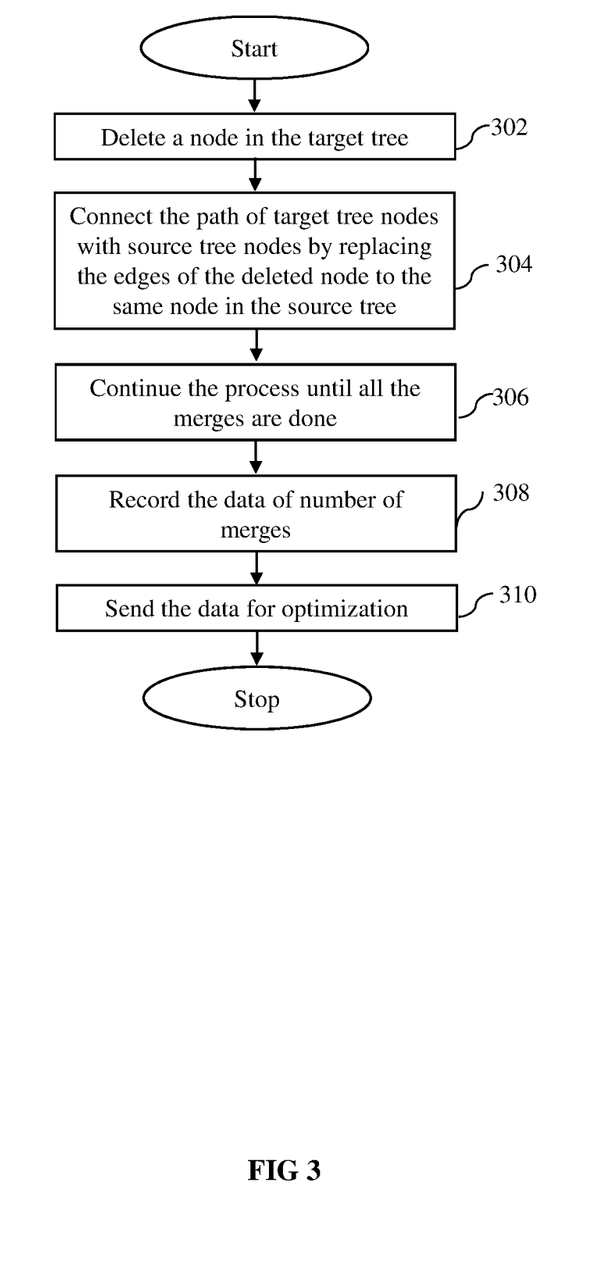
FIG. 3 is a flowchart illustrating the method for merging the nodes based on the predefined rules, in accordance with an embodiment of the present invention.

FIG. 3 is a flowchart illustrating the method for merging the nodes based on the predefined rules, in accordance with an embodiment of the present invention. The one or more predefined rules may have at least two components, (i) rule to filter a node and (ii) a logical expression. The Logical expression may be constructed using unique id of an element. In an embodiment of the present invention, the element is an object required for the designing of a flowchart, and may include a start, a processing box, a decision or an edge in the test case tree model. The logical expression is applied only on those test cases that passes through the filter node. Each of the logical expressions is required to have a filter that comprises one of the elements and that indicates the 'start' of a logical expression. The logical expressions can be defined as combinations of one or more operators such as 'NOT', 'AND', 'OR', that can be used to restrict the unwanted or invalid path getting generated.

At step 302, the target tree is selected and a node of the target tree is deleted. The node of the target tree is deleted when a match is found between the source tree node and the target tree node, and when the previous/successive nodes of the matched nodes are same in both the source tree and the target tree. The nodes of the target tree may also be deleted or removed based on one or more factors, such as redundancy of a node, mergers of nodes. The nodes may be deleted so that multiple duplicate nodes are not created, and the test engineers can use the existing node for different test cases. This also improves the performance when one or more models are compiled together. Further, a better view of the final tree models can be provided to the test engineers when the duplicate and redundant nodes are removed.

At step 304 the path of the target tree of the deleted node is connected with the source tree nodes so that the path leading to the deleted node may not remain open. The connection of the path of the deleted node is made by replacing the edges of the deleted node to the same node in the source tree. For example, if $p^{th}$ node of target tree is deleted, then the connection is made between the path of the $p^{th}$ node of the target tree and $p^{th}$ node of the source tree, where 'p' is the sequence number of the nodes.

When the nodes to be merged are identified and merged, then the nodes previous to the merged nodes of the target test tree and source test tree are selected for comparison. This process is repeated until no previous node of the target is found. Thus, the bottom-up-approach is used for comparison and merging process until the top most node (or node 1) is reached. When no nodes are merged, then source test tree previous nodes are selected and the comparison process as explained above is repeated.

Further, when the source test step has different paths for multiple previous steps, then comparison is started from the leftmost path of the source and the target trees. In a scenario, when no match is found, then division node is identified and the path adjacent to the division node is selected for comparison. The process is continued until a match is found and the steps for merging the nodes are repeated.

At step 306, the process of merging the nodes is continued until all the merges are completed. The comparison process is stopped when no nodes from target is remaining for the test. At step 308 the total number of merges are recorded and stored in optimization repository for future reference and optimization of the test cases. At step 310, the recorded data is sent to an optimization module for performing the optimization of the test cases. The optimization module facilitates the users to preview the optimized data.

Figure 4:
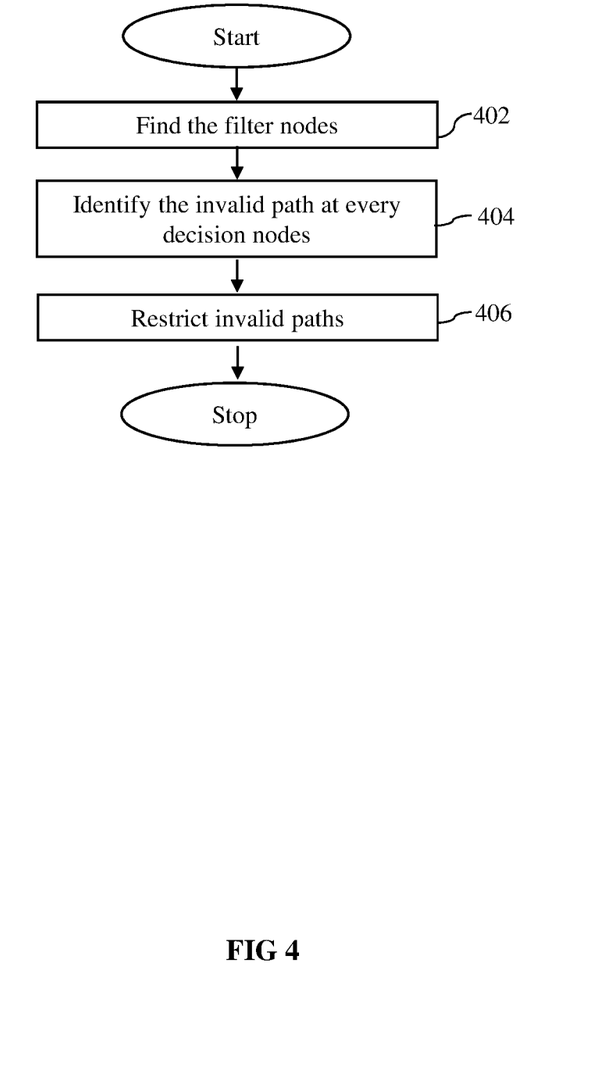
FIG. 4 is a flowchart illustrating the method for restricting any invalid path, in accordance with an embodiment of the present invention.

FIG. 4 is a flowchart illustrating the method for restricting any invalid path, in accordance with an embodiment of the present invention. At step 402, filter nodes are identified. The filter nodes are the nodes where an expression regarding the business flow has to be started. The nodes of the source tree and the target tree are analyzed to find the filter nodes. In one embodiment of the present invention, decision nodes are selected and analyzed to identify the filter nodes. The decision nodes may have one or more paths including at least one valid path and one or more invalid paths. It is essential to ensure that the valid paths are being followed and invalid paths are restricted. Therefore, at step 404, the valid paths are identified and allowed. Further, at step 406, the invalid paths or the unnecessary paths are restricted. According to an embodiment of the present invention, the invalid paths may be restricted or filtered out by using 'NOT' AND' and 'OR' Boolean operators.

Figure 5:
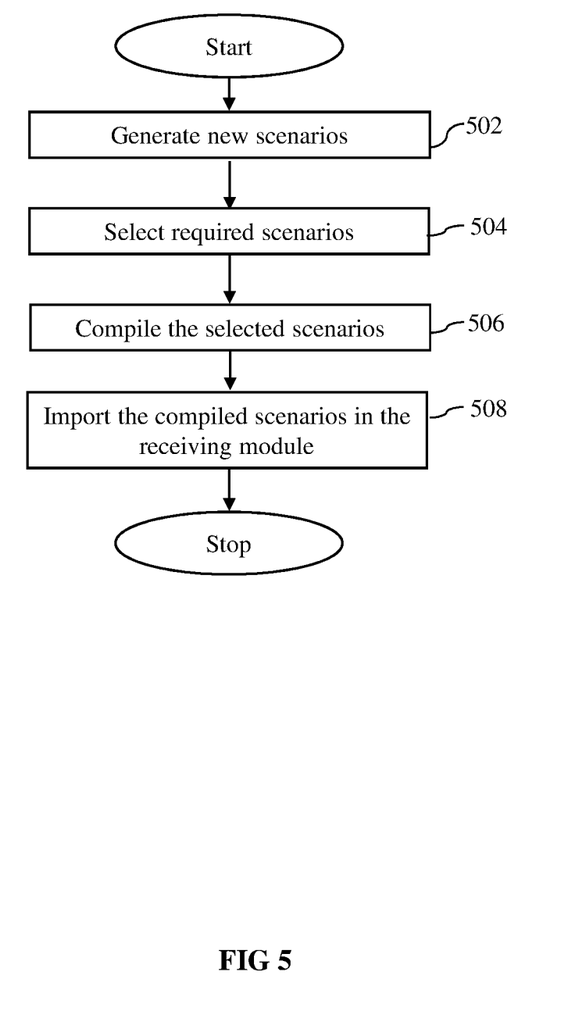
FIG. 5 is a flowchart illustrating the method for generating new scenarios for the business model, in accordance with an embodiment of the present invention.

FIG. 5 is a flowchart illustrating the method for generating new test scenarios for the business model, in accordance with an embodiment of the present invention. At step 502, one or more new test scenarios are generated. The new test scenarios are generated based on additional testing requirements (if any). The new scenarios may be generated and added or imported to the receiving module. Before importing to the receiving module, precise choice may be made by the software test engineer or the tester in selecting and sending the selected scenarios to the receiving module. Thus at step 504, one or more scenarios are selected that are required by the tester. At step 506, the selected scenarios are compiled and new test trees are created. The new test trees represent the compiled form of the selected new test scenarios. At step 508, the new compiled test scenarios are imported in the receiving module for analysis, optimization and business model generation.

Figure 6:
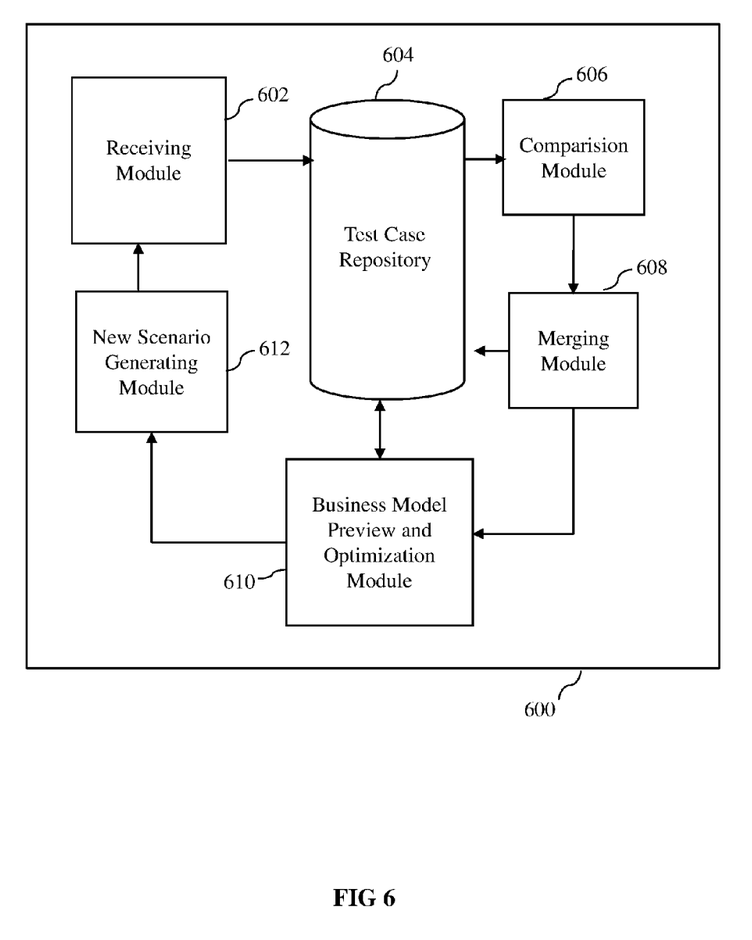
FIG. 6 is a block diagram illustrating a system for automatically generating optimized business models, in accordance with an embodiment of the present invention.

FIG. 6 is a is a block diagram illustrating a system for automatically generating optimized business models, in accordance with an embodiment of the present invention. The system 600 facilitates in automatically generating optimized business models without requiring any user intervention. In one embodiment of the present invention, the system 600 may be implemented on one or more electronic communication devices, the electronic communication device having at least a processor, a memory an input module and an output module such as a display screen. The system 600 comprises a receiving module 602, a test case repository 604, a comparison module 606, a merging module 608, an optimization repository 610, business model preview and optimizing module 612, a new scenarios generating module 614.

The receiving module 602 is configured to receive one or more test cases from various sources. The test cases are stored in the test case repository 604. In one embodiment of the present invention, the test case repository maintains a list of the stored test cases. The one or more test cases may be the existing test cases that are already available to be used for software testing. These test cases are either drafted manually, or are automatically generated by using business models and various software tools. The test cases are generally drafted by the software test engineers for testing the various functional aspects of a software application or a system under test. In an embodiment of the present invention, the test engineers use separate tree models, also termed as the test case trees to separately represent the test cases. Thus, the one or more test cases are represented by separate tree models and are imported within the receiving module 602 and are stored in the test case repository 604. Each of the one or more test case trees comprises one or more nodes that represents the start and end of any transaction or function occurring in the model. The various nodes include start node, end node, processing node, decision node and various other nodes related to the various business execution flows of the software applications. In various embodiments of the present invention, the nodes represents a single unit or multiple units of functionalities of the software applications under test and functionalities or the business transactions of the software application are based on various business requirements regarding software testing.

The stored test cases in the test case repository 604 are sent to the comparison module 606. The comparison module 606 is configured to compare the test cases in order to identify the nodes that can be merged together. The merging module 608 is configured to merge the identified nodes. The nodes to be merged are identified on various parameters including but not limited to test case IDs, processing steps of the test cases, flows or paths between the start nodes and the end nodes, inputs and outputs, expected results, and actions related to testing of the software applications. The merged nodes are sent to the test case repository 604 and the business model preview and optimization module 610 that optimizes the merged nodes to generate the business models. The business model preview and optimization module 610 provides previews of the business models so that the testers are facilitated to view the generated business models. The optimization module 610 may be interfaced with the display screen of the electronic communication device for facilitating the tester to preview the test tree models on the screen.

The new scenarios generating module 612 generates new test scenarios based on additional testing requirements (if any) by the tester. The new scenarios may be generated by the tester based on the requirements of the application under test, and may be imported to the receiving module 602. Before importing to the receiving module, precise choice may be made by the software test engineer or the tester in selecting and sending the selected scenarios to the receiving module 602. The selected scenarios are compiled and new test trees are created and are imported in the receiving module 602 for analysis, optimization and business model generation.

Figure 7A:
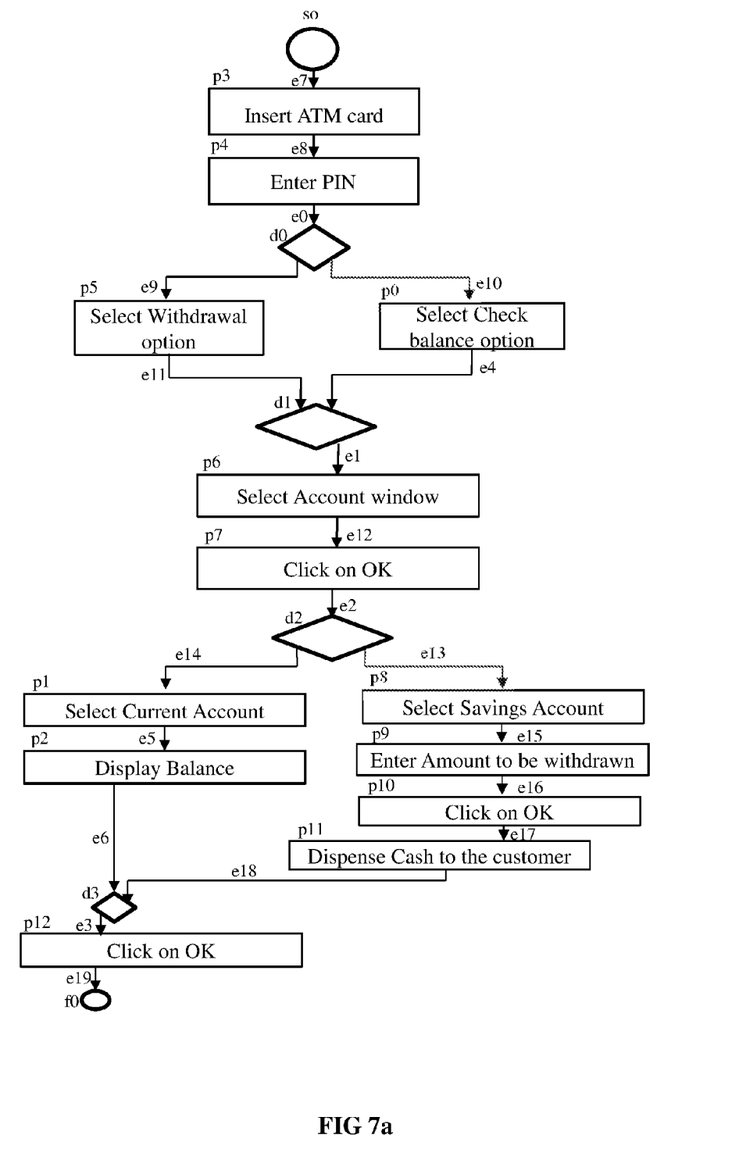
FIG. 7a, 7b show a tree diagram of an exemplary business model, in accordance with an exemplary embodiment of the present invention.

FIG. 7*a* is a tree diagram of an exemplary business model, in accordance with an embodiment of the present invention. The business model is generated by using two existing test cases. Test cases TC_01, TC_02, TC_03, and TC_04 are generated wherein TC_03 and TC_04 are the new test cases that are generated during the process of merging. These four test cases are the examples of banking transactions using an ATM machine. The test cases are listed in the below table along with the description of transactions. The four test cases are compared and merged according to the embodiments of the present invention, to generate the business model as shown in FIG. 7*a*.

| Test Case ID | Test Step Description |
|---|---|
| TC_01 | Insert ATM card |
| | Enter PIN |
| | Select Check balance option |
| | Select Account window |
| | Click on OK |
| | Select Current Account |
| | Display Balance |
| | Click on EXIT |
| TC_02 | Insert ATM card |
| | Enter PIN |
| | Select Withdrawal option |
| | Select Account window |
| | Click on OK |
| | Select Savings Account |
| | Enter Amount to be withdrawn |
| | Click on OK |
| | Dispense Cash to the customer |
| | Click on EXIT |
| TC_03 | Insert ATM card |
| | Enter PIN |
| | Select Withdrawal option |
| | Select Account window |
| | Click on OK |
| | Select Current Account |
| | Display Balance |
| | Click on EXIT |
| TC_04 | Insert ATM card |
| | Enter PIN |
| | Select Check balance option |
| | Select Account window |
| | Click on OK |
| | Select Savings Account |
| | Enter Amount to be withdrawn |
| | Click on OK |
| | Dispense Cash to the customer |
| | Click on EXIT |

The above listed test cases can be used to generate the business models as shown in FIG. 7*a*. In the given example, four Test cases TC_01, TC_02, TC_03, and TC_04 are generated wherein TC_03 and TC_04 are the new test cases that may be generated during the process of merging. Based on the requirements, the tester can restrict the generation of any new test case by applying the predefined rules. Thus, to restrict the generation of the new test cases, the tester can filter the nodes that possess the potential of generating new test cases. For example, root node e9 and root node e10 are the nodes that are generating the new test cases TC_3 and TC_4 when e9 passes through p1 and e10 passes through p8. Hence, to filter the new test cases, the root of TC_3 and TC_4, which are e9 and e11) respectively, are identified. Predefining rules comprising Boolean operations and logical expressions may be used to filter or restrict the test cases TC_3 and TC-4. In the exemplary embodiment of the present invention, to filter TC-3, e9 is identified by the tester and it is ensured that TC_3 does not pass through p1. Thus, e9 is selected and logical expression '!p1' is applied on e9 to filter TC_3. Similarly, node e10 is identified and selected, and logical expression '!p8' is applied on node e11) to filter TC_4.

Figure 7B:
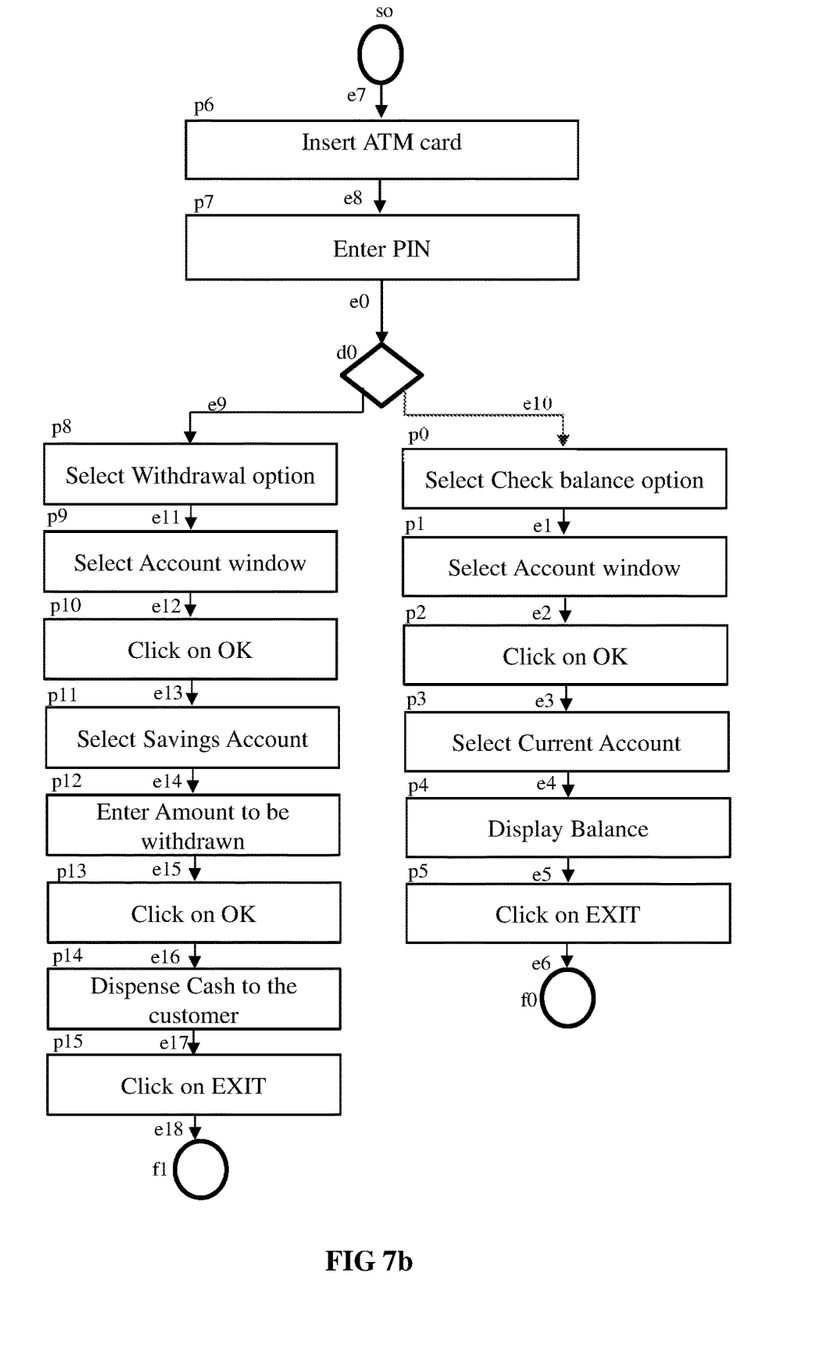

FIG. 7*b* is a tree diagram of an exemplary business model for above-explained test cases TC1 and TC2 without the implementation of any mergers or filters, in accordance with an embodiment of the present invention. The figure shows the basic simple model that can be drafted manually when the no filters or mergers are to be applied.

Figure 8:
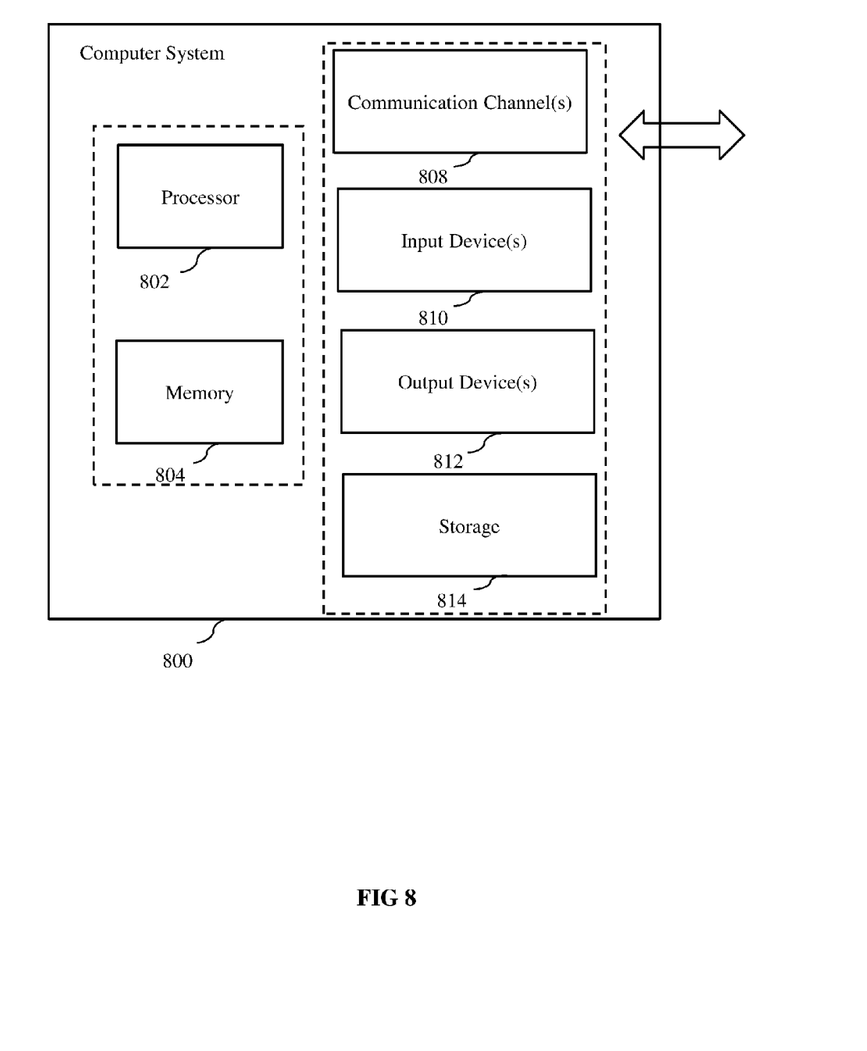
FIG. 8 illustrates an exemplary computer system in which various embodiments of the present invention can be implemented.

FIG. 8 illustrates an exemplary computer system in which various embodiments of the present invention may be implemented. The computer system 802 comprises a processor 804 and a memory 806. The processor 804 executes program instructions and may be a real processor and/or a virtual processor. The computer system 802 is not intended to suggest any limitation as to scope of use or functionality of described embodiments. For example, the computer system 802 may include, but is not limited to, a general-purpose computer, a programmed microprocessor, a micro-controller, a peripheral integrated circuit element, and other devices or arrangements of devices that are capable of implementing the steps that constitute the method of the present invention. In an embodiment of the present invention, the memory 806 may store software for implementing various embodiments of the present invention. The computer system 802 may have additional components including one or more communication channels 808, one or more input devices 810, one or more output devices 812, and storage 814. An interconnection mechanism (not shown) such as a bus, controller, or network, interconnects the components of the computer system 802. In various embodiments of the present invention, operating system software provides an operating environment for various processes being executed in the computer system 802, and manages different functionalities of the components of the computer system 802. The communication channel(s) 808 allow communication over a communication medium to various other computing entities. The communication medium provides information such as program instructions, or other data in a communication media.

The input device(s) 810 may include, but not limited to, a keyboard, mouse, pen, joystick, trackball, a voice device, a scanning device, or any another device that is capable of providing input to the computer system 802. In an embodiment of the present invention, the input device(s) 810 may be a sound card or similar device that accepts audio input in analog or digital form. The output device(s) 812 may include, but not limited to, a user interface on CRT or LCD, printer, speaker, CD/DVD writer, or any other device that provides output from the computer system 802.

The storage 814 may include, but is not limited to, magnetic disks, magnetic tapes, CD-ROMs, CD-RWs, DVDs, flash drives or any other medium which can be used to store information and can be accessed by the computer system 802. In various embodiments of the present invention, the storage 814 contains program instructions for implementing the described embodiments.

The present invention may suitably be embodied as a computer program product for use with the computer system 802. The method described herein is typically implemented as a computer program product, comprising a set of program instructions which is executed by the computer system 802 or any other similar device. The set of program instructions may be a series of computer readable codes stored on a tangible medium, such as a computer readable storage medium (storage 814), for example, diskette, CD-ROM, ROM, flash drives or hard disk, or transmittable to the computer system 802, via a modem or other interface device, over either a tangible medium, including but is not limited to optical or analogue communications channel(s) 808. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as an apparatus, method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

What is claimed is:

1. A computer-implemented method for analyzing one or more test case trees for automatically generating an optimized test tree model, the computer implemented method comprising:
   configuring a computer processor, the computer processor:
      receiving the one or more test case trees as user input from a user interface, each tree having one or more nodes, each node corresponding to a functionality of a test case;
      analyzing each of the received test case trees to identify a source tree and a target tree based on the length of the test case tree;
      analyzing levels of each node of the source tree and the target tree for identifying a source node and a target node, the source node being the bottom most node of the source tree and the target node being the bottom most node of the target tree;
      comparing the source node and the target node, based on one or more parameters, to obtain a match;
      merging the source node with the target node when the match is obtained, else identifying a next source node and a next target node, and repeating the steps of comparing and merging the identified nodes;
      optimizing the merged nodes by identifying and filtering out one or more invalid nodes and generating the optimized tree model by using the optimized nodes.

2. The computer-implemented method as in claim 1, wherein the one or more parameters include but is not limited to test case IDs, processing steps of the test cases, paths between the start nodes and the end nodes, user preferences, expected results, and actions related to the test case.

3. The computer-implemented method as in claim 1, wherein the identification of the next source node and the next target node is further based on the references of the previously identified source nodes, target nodes and the merged nodes.

4. The computer-implemented method as in claim 3, wherein the references of the merged nodes are saved in a repository.

5. The computer-implemented method as in claim 1, wherein optimizing the test tree models further comprises the step of connecting the path of the target node with the path of the source node.

6. The computer-implemented method as in claim 1, wherein the source tree is the lengthiest tree of the one or more test case trees, and the target tree is the next lengthiest tree of the one or more test case trees.

7. The computer-implemented method as in claim 1, wherein the invalid nodes include at least one of: redundant nodes, nodes associated with invalid paths.

8. The computer-implemented method as in claim 1, wherein any invalid node is filtered out by using a logical expression comprising a Boolean operator and reference of the invalid node.

9. A system for analyzing one or more test case trees for automatically generating an optimized test tree model, the system comprising:
   at least one computer processor;
   a receiving module configured by the at least one computer processor to receive the one or more test case trees as user input from a user interface, each tree having one or more nodes and each node corresponding to a functionality of a test case, wherein based on the length of the test case trees, the received one or more test case trees are analyzed by the at least one computer processor to identify a source tree and a target tree;
   a comparison module configured by the at least one computer processor to compare a source node and a target node based on one or more parameters to obtain a match, wherein the source node and the target node are the bottom most nodes of the source tree and the target tree respectively, and the source node and the target node are identified by the at least one computer processor by analyzing levels of each node of the source tree and the target tree;
   a merging module configured by the at least one computer processor to merge the source node with the target node when the match is obtained, else prompting the at least one computer processor to identify a next source node and a next target node, and to repeat the steps of comparing and merging the identified nodes;
   an optimization module configured by the at least one computer processor to optimize the merged nodes by identifying and filtering out one or more invalid nodes and generating the optimized tree model by using the optimized nodes.

10. The system as in claim 9, wherein the one or more parameters include but is not limited to test case IDs, processing steps of the test cases, paths between the start nodes and the end nodes, user preferences, expected results, and actions related to the test case.

11. The system as in claim 9, wherein the identification of the next source node and the next target node is further based on the references of the previously identified source nodes, target nodes and the merged nodes.

12. The system as in claim 11, wherein the references of the merged nodes are saved in a repository.

13. The system as in claim 9, wherein optimizing the test tree models further comprises the step of connecting the path of the target node with the path of the source node.

14. The system as in claim 9, wherein the source tree is the lengthiest tree of the one or more test case trees, and the target tree is the next lengthiest tree of the one or more test case trees.

15. The system as in claim 9, wherein the invalid nodes include at least one of: redundant nodes, nodes associated with invalid paths.

16. The system as in claim 9, wherein any invalid node is filtered out by using a logical expression comprising a Boolean operator and reference of the invalid node.

17. A computer program product comprising:
- a non-transitory computer readable medium having computer readable program code stored thereon, the computer readable program code comprising instructions that, when executed by at least one computer processor, cause the at least one computer processor to:
  - receive the one or more test case trees as user input from a user interface, each tree having one or more nodes, each node corresponding to a functionality of a test case;
  - analyze each of the received test case trees to identify a source tree and a target tree based on the length of the test case tree;
  - analyze levels of each node of the source tree and the target tree for identifying a source node and a target node, the source node being the bottom most node of the source tree and the target node being the bottom most node of the target tree;
  - compare the source node and the target node, based on one or more parameters, to obtain a match;
  - merge the source node with the target node when the match is obtained, else identifying a next source node and a next target node, and repeating the steps of comparing and merging the identified nodes;
  - optimize the merged nodes by identifying and filtering out one or more invalid nodes and generating the optimized tree model by using the optimized nodes.

* * * * *